July 21, 1964  M. S. SUSSMAN ETAL  3,141,554
ADJUSTABLE MULTIPLE-UNIT TRAY-SUPPORTED RACK
Filed June 13, 1962  5 Sheets-Sheet 1
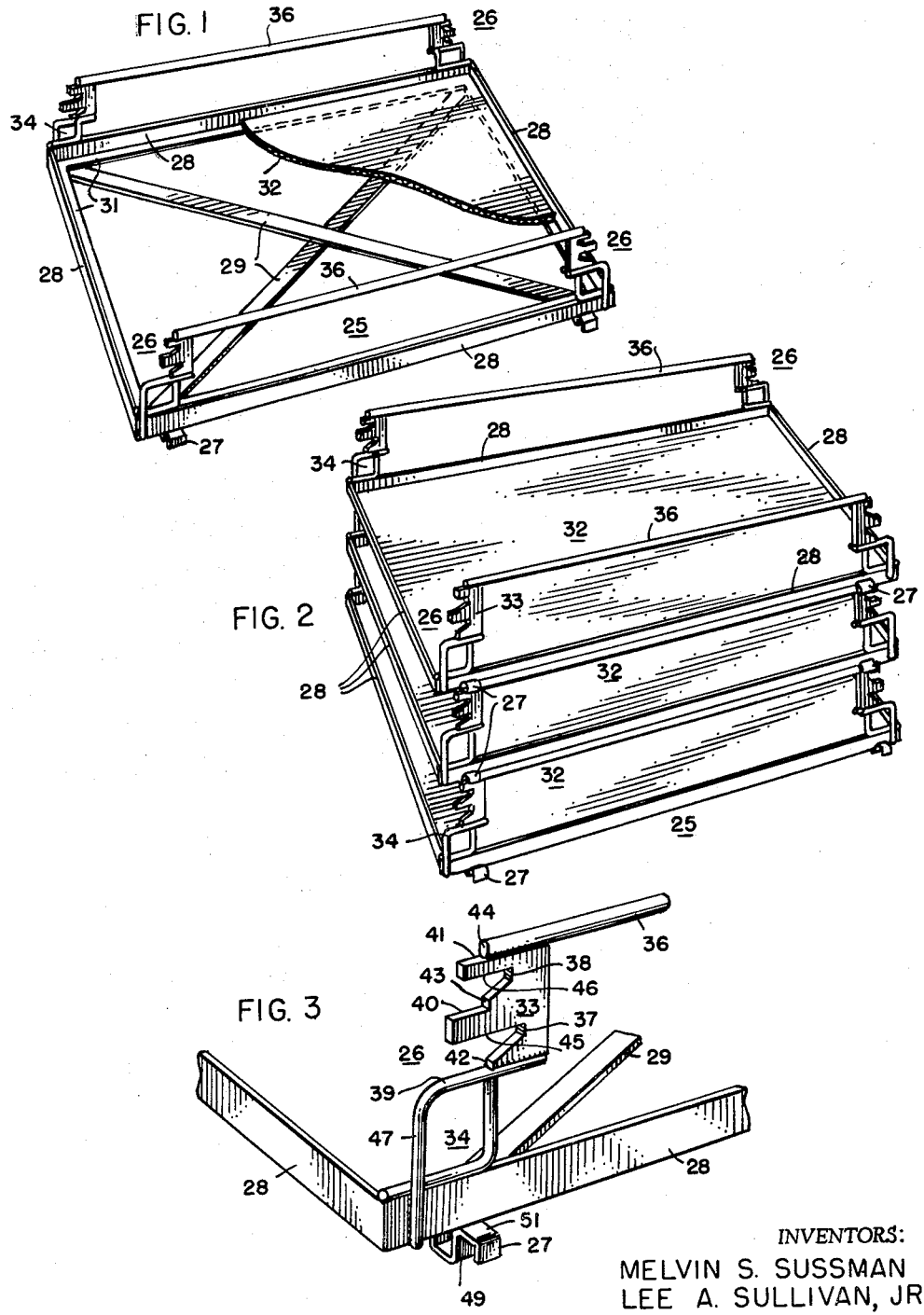
INVENTORS:
MELVIN S. SUSSMAN
LEE A. SULLIVAN, JR.
BY
ATT'YS

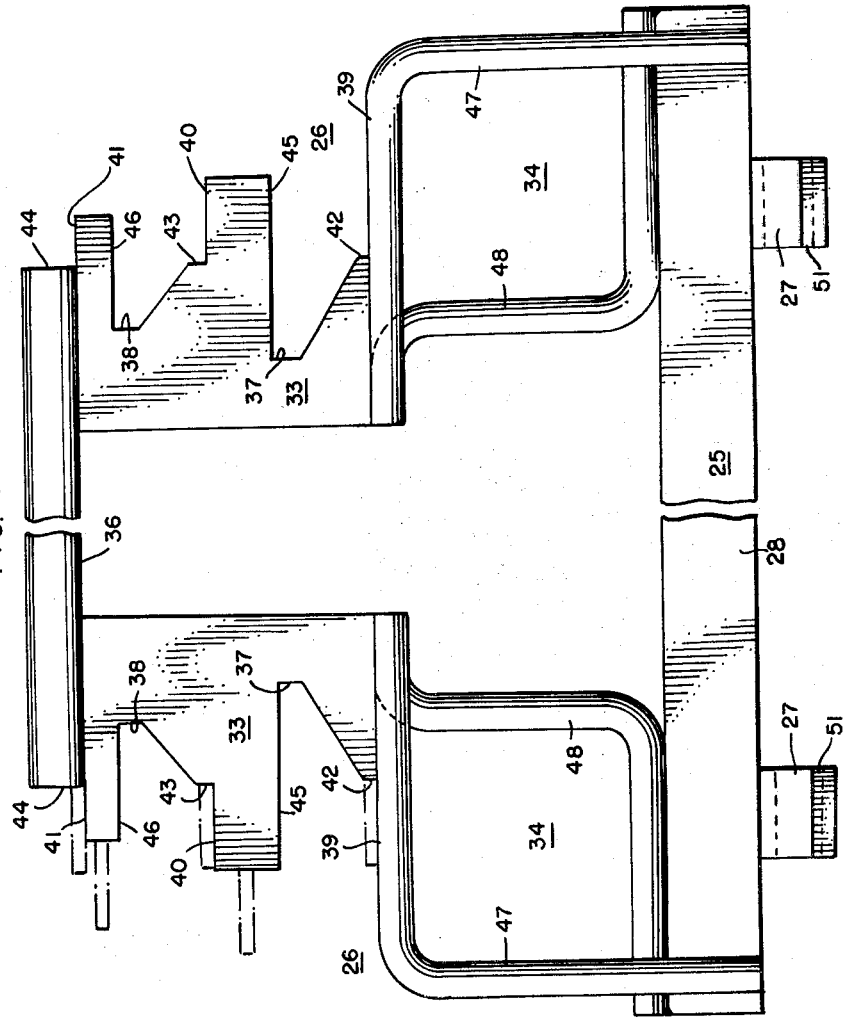
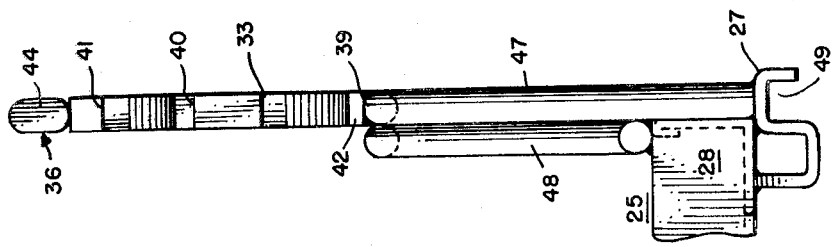

July 21, 1964 M. S. SUSSMAN ETAL 3,141,554
ADJUSTABLE MULTIPLE-UNIT TRAY-SUPPORTED RACK
Filed June 13, 1962 5 Sheets-Sheet 3
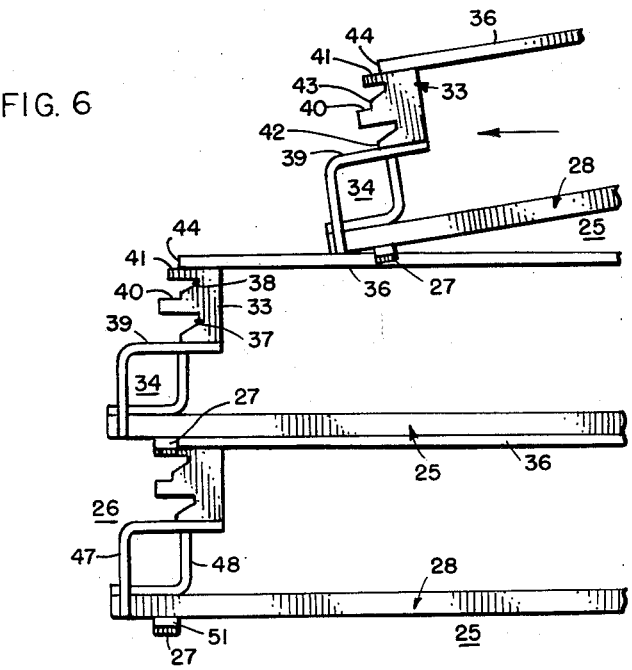
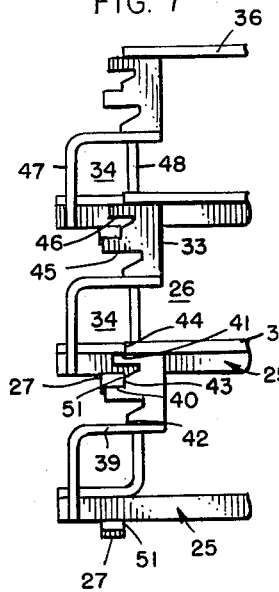
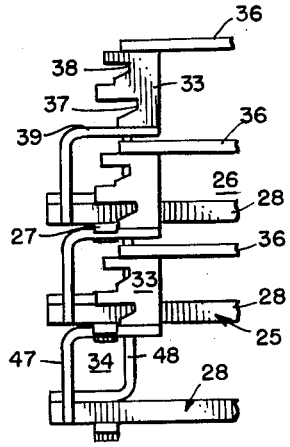
INVENTORS:
MELVIN S. SUSSMAN
LEE A. SULLIVAN, JR.
ATT'YS July 21, 1964  M. S. SUSSMAN ETAL  3,141,554
ADJUSTABLE MULTIPLE-UNIT TRAY-SUPPORTED RACK
Filed June 13, 1962  5 Sheets-Sheet 4
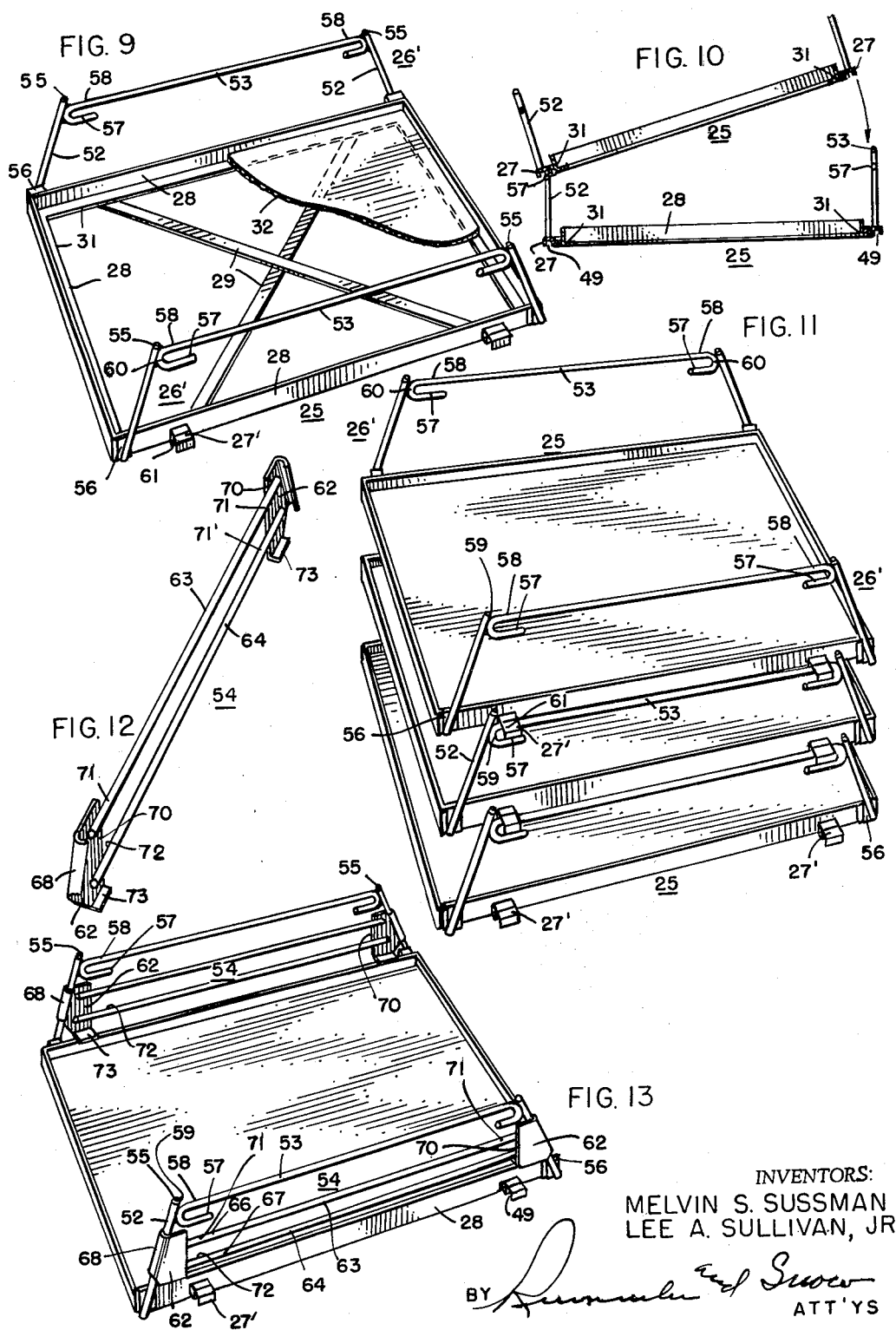
INVENTORS:
MELVIN S. SUSSMAN
LEE A. SULLIVAN, JR.
BY
ATT'YS July 21, 1964    M. S. SUSSMAN ETAL    3,141,554
ADJUSTABLE MULTIPLE-UNIT TRAY-SUPPORTED RACK
Filed June 13, 1962    5 Sheets-Sheet 5
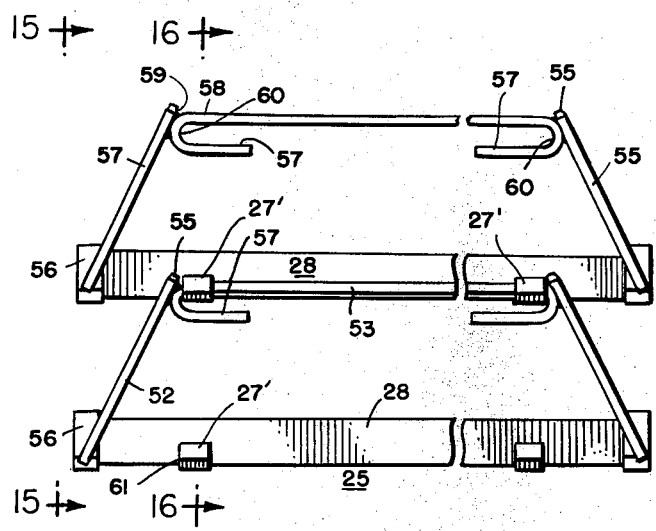
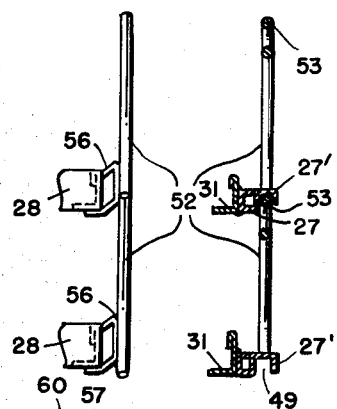
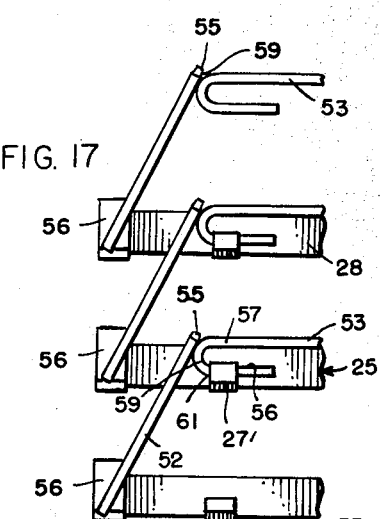
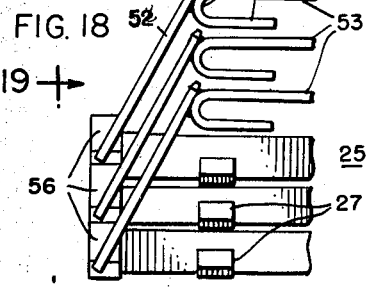
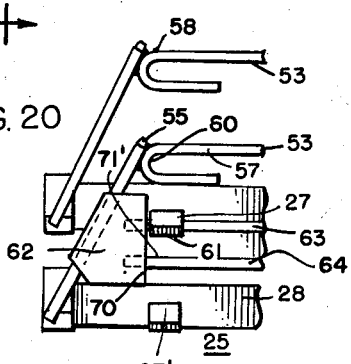
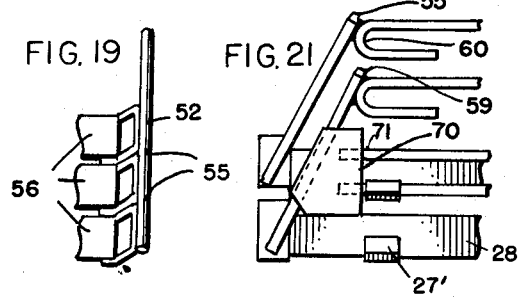
INVENTORS:
MELVIN S. SUSSMAN
LEE A. SULLIVAN, JR.
ATT'YS United States Patent Office 3,141,554
Patented July 21, 1964

1

3,141,554
ADJUSTABLE MULTIPLE-UNIT TRAY-
SUPPORTED RACK
Melvin S. Sussman, Galesburg, and Lee A Sullivan, Jr.,
Jacksonville, Ill., assignors to Con-O-Mizers, Inc.,
Galesburg, Ill., a corporation of Illinois
Filed June 13, 1962, Ser. No. 202,249
9 Claims. (Cl. 211—126)

This invention relates to adjustable tray-supporting rack units for use in storage and/or transport of products of varying heights.

Producers of lines of relatively small products which vary in size, especially height, find it expedient to store and/or transport such products on trays arranged vertically in stacks with a view to making the most effective use of space. As a rule, the facility for stacking the trays is an open framework commonly referred to as "tray rack." Heretofore such tray-racks have been fabricated unitary structures generally with uniform vertically-spaced tray-supporting ledges.

In some industries these tray-racks are loaded with the product trays and then set in trucks for transport to the point of product use or sale. At the point of use or sale, either the trays are removed from the rack and placed in some form of rack provided at the point of product use or sale, or the rack as a whole is removed from the truck and placed at the point of use or sale of the products. In that latter event the rack for a previously-delivered set of trays would be returned to the truck. In either instance, the empty racks, occupying their normal space, have to be returned to the source from whence the products emanated. Currently, the above practice prevails in the baking industry. Here, the products—bread, cake, pies—are of variable heights. A standard-size tray is used for the support of these variable-size products. The tray racks conventionally used have tray-supporting ledges uniformly spaced apart to accommodate the maximum height product—bread. Hence, a tray of pies may take only one-third or one-half the space required for bread. Accordingly, there often is much-wasted space in either storage or transport of products with the racks currently being used.

The main objects of this invention are to provide an improved tray-supporting unit structured to permit a plurality of units to be assembled into predetermined, vertically-spaced relationship to form a storage and/or transport rack; to provide tray-supporting units of this kind permitting variable spacing of a number of units in a stack to accommodate trays loaded with products of varying heights; to provide improved tray-supporting units of this kind which when not required for supporting loaded trays, may be arranged in a stack with the minimum of spacing between the units; and to provide improved tray-supporting units of this kind of such simple construction as to make the manufacture thereof very economical and the use thereof most facile for forming racks for the accommodation of variable-height products for storage or transport.

In the two adaptations shown in the accompanying drawings;

FIGURE 1 is a perspective view of a preferred form

2 of tray-supporting unit constructed in accordance with this invention:

FIG. 2 is a perspective view of three of the units, shown in FIG. 1, stacked in their maximum vertical spacing with the form of spacer elements therein shown;

FIG. 3 is a somewhat enlarged, fragmentary, perspective of the forward corner of the unit shown in FIG. 1;

FIG. 4 is a very-much enlarged, fragmentary, side elevation of the unit shown in FIG. 1;

FIG. 5 is left-hand elevation of what is shown in FIG. 4;

FIG. 6 is a side elevational view of the forward ends of three of the units, such as shown in FIG. 1, with the intermediate unit set on the uppermost position on the lower unit and with the topmost unit positioned to be moved into the desired relationship on the intermediate unit;

FIG. 7 is a view similar to FIG. 6 but showing the three units in their intermediate spaced relationship;

FIG. 8 is a view similar to FIG. 7 but showing the three units set in their lowermost spaced relationship;

FIG. 9 is a perspective view of a modified form structure of a tray-supporting unit constructed in accordance with this invention;

FIG. 10 is an end view of the manner in which the units, of the adaptation shown in FIG. 9, have to be relatively angled to effect the stacking thereof;

FIG. 11 is a perspective view of three of the units, of the type shown in FIG. 9, stacked in their maximum vertical-spaced relationship;

FIG. 12 is a perspective view of one of a pair of supplemental components for use in increasing the number of spacings at which the units, such as shown in FIG. 9, can be vertically arranged;

FIG. 13 is a perspective view of a unit, such as shown in FIG. 1, with a pair of the supplemental components set thereon;

FIG. 14 is a side elevation of two of the units, of the type shown in FIG. 9, with the top unit at its maximum spacing from the lower unit;

FIG. 15 is a fragmentary, end view of the two positioned units shown in FIG. 14, taken on the plane of the line 15—15 of that figure;

FIG. 16 is a fragmentary, sectional view of the two stacked units of FIG. 14 taken on the plane of the line 16—16 of that figure;

FIG. 17 is a side elevation of the forward ends of three of the units, of the type shown in FIG. 9, positioned in their intermediate spaced relationship;

FIG. 18 is a similar view of the units positioned in their minimum vertically-spaced relationship;

FIG. 19 is a fragmentary end view of what is shown in FIG. 18 taken on the plane of the line 19—19 of that figure;

FIG. 20 is a side elevational view of the ends of two of the units, of the type shown in FIG. 9, positioned on the upper end of the supplemental component such as shown in FIG. 12; and FIG. 21 is a similar view of the ends of the two units positioned on the lower rod of the supplemental component such as shown in FIG. 12.

The essential concept of this invention involves a tray-supporting unit with multiple-ledged spacer-elements laterally-disposed above a base frame mounting laterally-spaced and aligned brackets for seating on the spacer-element ledges to permit stacking a plurality of units in varied vertically-spaced relationship.

A tray-supporting unit embodying the foregoing concept comprises a base frame 25 mounting laterally-arranged spacer elements 26 (26′) formed with a plurality of the hereinafter identified ledges for selectively seating the base-frame brackets 27 to form a stack of units in varied, vertically-spaced relationship.

The base frame 25, as most clearly shown in FIGS. 1 and 9, is structured from sections of conventional angle bar in rectangular contour with the angles facing inwardly upward. Diagonally-arranged cross braces 29, bonded at their ends adjacent the respective diagonal corners of the base frame 25, insure ample rigidity. The inwardly-extending flanges 31 of the angle bar sections 28 afford support for either trays, properly dimensioned, or for panels 32 to support trays of smaller dimensions than the distances between the sides and ends of the base frame 25, or for the panels 32 to support products directly thereon without resorting to the use of auxiliary trays.

The spacer elements (26–26′), whereby the tray-supporting units can be stacked in selected vertical relationship, here are shown of two quite different forms, FIGS. 1–8 and FIGS. 9–21 respectively.

The spacer elements 26 of the adaptation of FIGS. 1–8, are shown as small plates 33 mounted on end supports 34 with rails 36 spanning and bonded at their ends to the top edges of the plates 33 whereby the plates 33, the end supports 34, and the connecting rails 36 are disposed in vertical alinement along the lateral sides of the base frame 25. Each plate 33 is formed with a pair of recesses 37 and 38 so shaped, spaced and related to the respective end-support 34 and the rail 36 as to provide a series of vertically-spaced ledges 39, 40 and 41 inwardly terminating at shoulders 42, 43 and 44 and with overhanging ridges 45 and 46 vertically opposed to the respective ledges 39 and 40. The form and dimensions of the recesses 37 and 38 are best shown in FIG. 4. As will be noted the recess 37 is a bit deeper than the recess 38 and the ledges 39, 40 and 41 are successively shortened from the support 34 upwardly, all for reasons to be explained later. However, the shoulders 42, 43 and 44 are in vertical alinement, also for a reason to be explained later.

The supports 34 here are shown as parts of angled rods 47 and 48 bonded at their overlapping ends with the respective angles opposed to simulate an open rectangle. Each support 34 mounts a plate 33 which is bonded along its inner end to the horizontal leg of the angle rod 47. Pairs of supports 34 have the horizontal legs of the other angled rods 48 bonded along the top edges of the vertical flanges of the lateral angle bar sections 28, adjacently inward from the opposite ends thereof.

The rails 36, as here shown, are rods—preferably elliptical in cross-section—bonded at their ends to the top edges of the laterally-aligned plates 33. The ends of the rods terminate short of the outside edges of the plates 33 to coact with the top edges of the plates 33 in the formation of the top ledges 41. The rails 36 serve a triple purpose. One purpose is to effect a rigid relationship of the laterally-spaced plates 33. Another purpose, and most important one, is to provide guides for the facile and certain positioning of units one on top of another at a desired vertical spacing, especially when the stacking occurs above the eye level of the one doing the stacking. A third purpose is for the rail ends to serve as shoulders 44 for the respective uppermost ledges 41.

The brackets 27 (27′), of which there are four for each base frame 25, for either unit adaptation are practically of the same general form and positioning on the respective adaptations. The essential function of the brackets 27 (27′) is to provide laterally-aligned downwardly-opening pockets 49 to seat over the various ledges on the spacer elements 26 (26′). To that end the brackets 27 (27′) are shaped and positioned to dispose the pockets 49 in vertical alignment with the respective spacer element ledges—that is, with the plates 33 and the rods 47 of the supports 34 in the case of the adaptation of FIGS. 1–8. In this adaptation, the brackets 27 are substantially S-shape and so bonded to the under face of the horizontal flange 31 of the lateral angle bar section 28 as to dispose the pockets 49 in the aforesaid alignment with the ledges 39, 40 and 41. In fact, this vertical alignment of the brackets is such that the inner edges thereof constitute shoulders 51 which abut the respective shoulders 42, 43 and 44 to insure a positive vertical location of the units in a stack and secure them against accidental horizontal shifting when set on either of the sets of ledges 39, 40 and 41, as presently will be explained more fully.

When the units are stacked in use relationship the ridges 45 and 46, on the plates 33, serve to prevent any accidental separation of the units should the stack be subject to some extraordinary forceful shock during transport.

The spacer elements 26′, for the adaptation shown in FIGS. 9–21, comprises posts 52 mounting spanning rails 53 and the supplemental components 54.

The posts 52 here are shown as straight, short sections of rod bonded at their lower ends to bracket 56 which brackets in turn are bonded to the perimeters of the lateral angle bar sections 28. The bonding of the brackets 56 to the posts 52 and to the base frame 25 is such as to dispose the posts 52 extending inwardly and upwardly above the base frame 25.

The rails 53, likewise sections of rod, have short end portions turned inwardly and rearwardly and spaced from the intermediate portion of the rail to form end ledges 57 spaced inwardly below the ledges 58 formed by the ends of intermediate portions of the respective rails 53. The bonding of the bent ends of the rails 53 to the posts 52 disposes the upper ends 55 of the posts 52 enough above the rails 53 to constitute shoulders 59 vertically-spaced above the shoulders 60 formed by the end bends in the rails 53.

The brackets 27′, for this adaptation of FIGS. 9–21, are practically the same as those for the previously-described modification of FIGS. 1–8. However, in this instance these brackets 27′ are so bonded to the vertical flanges of the lateral angle bar sections 28 as to dispose the pockets 49 in vertical alignment with the posts 52 and rails 53, and located sufficiently inward of the base-frame ends that the outer edges of the brackets 27′ constitute shoulders 61 which coact with the shoulders 59 and 60 to secure the units against horizontal shifting in their vertically-stacked relationship.

The supplemental components 54 each comprises a pair of members 62 bonded at the ends to top rods 63, and the bottom bracing rod 64. It should be obvious from FIG. 13 that since supplemental components are placed one on each of the sides of the unit the members 62 on one pair must be reversed before bonding to the rails 63–64 on the inner face of member 62 in order to be operative.

The members 62 here are shown as pentagonal-shaped metal stampings wherein the perimetrical portion of one of the non-normal sides is curled over to form an open clip 68 angled to the edge 73 to which the two parallel edges are normal. These members 62 are right and left hand and each pair is bonded to the ends of a pair of rods 63 to oppose the clips 68 in the same relative angular disposition as a pair of opposed posts 52. Thus, when the clips 68 are set over a pair of posts 52 the pair of rods 63–64 are disposed intermediately parallel to the base frame 25 and the rail 53 to provide two additional ledges 71 and 71' (as shown in FIGS. 20 and 21) vertically aligned with the ledges 57 and 58. To insure proper positioning of the supplemental components 54 with respect to the rail 53 and the base frame 25 inwardly-turned flanges 73, on each member 62 (FIG. 12) below the respective clips 68, rest on the floor or foundation on which brackets 56 also rest.

The members 62 are so dimensioned and shaped that when the supplemental components 54 are seated on the pairs of the posts 52 the edges 70 of the members 62 are vertically aligned with the shoulders 59 for abutment with the bracket shoulders 61 to secure the stacked units against accidental horizontal shifting when the brackets 27 are seated on the pair of ledges 71 and 72 of the supplemental components 54.

The operation for stacking either of the hereinshown and described tray units basically is the same. One at a time the units are arranged one on top of another by setting the brackets 27 at one end of a unit over one or another of the several sets of horizontally-aligned vertically-spaced ledges so that the brackets abut the respective ledge shoulders. However, each of the adaptations herein shown and described require entirely different angulation and relative shifting of the units to effect the desired stacking.

For the adaptation shown in FIGS. 1–8 the operation is as follows:

To effect the maximum spacing of the units the operator grasps the center of the rails 36 of one unit and angles it directly above the under unit (FIG. 6) to permit setting the remote pair of brackets 27 of the one unit on ledges 41 of the under unit (FIG. 4). The remote brackets 27 of the upper unit are positioned to engage the rails 36 of the under unit and then the operator pushes the upper unit away from him so that the remote brackets 27 slide to the extreme end of the rails 36 and drop down to remote ledges 41. Then the near end of the upper unit can be lowered so that the near brackets 27 of the upper unit engage the near ledges 41 of the lower unit. Properly set, the shoulders 51 on the brackets 27 will abut the ledge shoulders 44 thereby securing the two units against any accidental relative horizontal shifting. (See FIGS 2 and 6.)

When it is desired to space the units at the intermediate distance, the operator positions the remote brackets 27 of the angled one unit to engage the rails 36 of the under unit. Then, as he pushes the upper unit rearward away from him he guides the near brackets 27 of the upper unit into the near recesses 38 of the under unit. When the shoulders 51 of the near brackets 27 of the upper unit strike the limit stop of the near recesses 38 of the under unit, the remote brackets 27 of the upper unit will have slid beyond the remote ends of rails 36 of the under unit, will have dropped down to and slid beyond the remote ends of ledges 41 of the under unit and will have dropped down to the remote ledges 40 of the under unit. Thereupon, the operator shifts the one unit forward toward him to allow the near pair of brackets 27 of the upper unit to recede from the recesses 38 of the under unit and set down onto the ledges 40 of the under unit with the shoulders 51 of the near pair of brackets 27 of the upper unit in contact with the near ledge shoulders 43 of the under unit (see FIG. 7) which, at the same time, will move the shoulders 51 of the upper unit on the remote pair of brackets 27 into abutment with the remote shoulders 43.

To set the one unit on the lowermost ledges 39 of the under unit, the operator positions the remote brackets 27 of the angled one unit to engage the rails 36 of the under unit. Then as he pushes the upper unit rearward away from him he guides the near brackets 27 of the upper unit into the near recesses 37 of the under unit. When the shoulders 51 of the near brackets 27 of the upper unit strike the limit stop of the near recesses 37 of the under unit the remote brackets 27 of the upper unit will have slid beyond the remote ends of rails 36 of the under unit, will have dropped down to and slid beyond the remote ends of ledges 41 of the under unit, will have dropped down to and slid beyond the remote ends of ledges 40 of the under unit, and will have dropped down to ledges 39 of the under unit. Thereupon the one unit is shifted forwardly to retract the near pair of brackets 27 from the near recesses 37 and be set down on the adjacent lowermost ledges 39 against the shoulders 42 (see FIG. 8) which, at the same time, will move the shoulders 51 of the remote brackets 27 of the upper unit against the remote shoulders 42.

When such successive stacking of units is effected below the eye level of the operator he readily can observe this changing positioning and shifting of one unit on another. However, when the units have to be stacked above the eye level of the operator the rails 36 become imperative to securing facile and positive vertical spacing. In such situation, each successive unit has the remote pair of brackets 27 set on the rails 36 of the under unit (see FIG. 6) and the unit is shifted rearwardly until the remote pair of brackets 27 either drop onto the pair of ledges 41 or be disposed for shifting into the recesses 38 or 37, as above explained. There follows, then, the above-explained (1) pushing of the one unit rearwardly away from the operator and guiding the near pair of brackets 27 of the upper unit up against the limit stop of one or the other of the recesses 38 or 37 of the under unit, (2) the lowering of the remote end of the one unit to seat the remote pair of brackets 27 on the selected ledges 40, or 39 and (3) shifting the one unit forwardly to set the near pair of brackets 27 of the upper unit on the same set of ledges with the bracket shoulders 51 abutting the shoulders at the respective ends of the selected ledges.

Once the desired stack of units has been effected, with whatever vertical spacing may be desired, a rack is ready for use in the placing of products, or trays of products, thereon preparatory for storage or transport. Stacking of the units can be effected either before or after placement of products, or trays of products, thereon. Because of the permitted varied spacing of the units in one stack, trays of products may be accommodated to the arrangement in the rack to make the most effective use of the available space.

Once such an assembly of units is completed there can be no accidental dislodgment of the units. When empty units are to be returned to the point of product production, the units may be stacked in the minimum permitted vertical spacing provided by the ledges 39, thus conserving space in transports returning units.

Obviously, the operation of disassembling a stack of units is just the opposite of that explained for assembling them. Each upper unit first would have to have the near end lifted just high enough to clear the respective shoulders (42, 43), to permit pushing the upper unit rearward to shift the remote pair of brackets 27 of the upper unit up into one or the other pair of near recesses (37 or 38) of the under unit. This will permit the remote end of the upper unit to be raised and inclined upwardly above the under unit. In such an inclined position the unit may be shifted forwardly to retract the near pair of brackets 27 of the upper unit from one or the other of the recesses 37 or 38 of the under unit. This will permit the near end of the unit to be lifted to clear the ends of the ridges 45 and/or 46 so that the unit can be lifted off from the under unit.

For the adaptation shown in FIGS. 9–21, the stacking operation is as follows:

To effect maximum vertical-spacing, the positioning of one unit on a lower unit requires angling the upper unit as shown in FIG. 10, to permit setting a pair of laterally-aligned brackets 27' of the upper unit pair of comparably aligned ledges 58 of the under unit. This will permit the one unit to be lowered to a position so that the opposite pair of laterally aligned brackets 27' on the upper unit may be seated on the opposite pair of laterally-aligned ledges 58 of the under unit. Such an operation is repeated with each unit placed above an under one until the desired number of units has been assembled into a stack.

To effect intermediate vertical-spacing, the positioning of one unit on a lower unit requires angling the upper unit as shown in FIG. 10, to permit the entire brackets 27' to pass between ledges 57 and 58 so that the outer side of the angle bar secton 28 of the upper unit contacts the inward side of the rail 53. This side shifting of one unit with respect to the other permits the upper unit to be lowered to a horizontal position with the remaining brackets 27' of the upper unit horizontally aligned with the space between ledges 57 and 58 of the under unit. Then the upper unit can be shifted laterally until the brackets 27' of the upper unit are vertically aligned with the intermediate ledges 57 of the under unit and lowered to permit pockets 49 to engage ledges 57.

It will be understood, of course, that in such a stack of units some will be set with their brackets 27' on ledges 57 while the units will have their brackets 27' set on ledges 58.

Obviously, the operation for disassembling such a stack of these units would be the reverse of that just explained for assembling the units. When stacked at maximum vertical-spacing, the upper unit can be lifted off vertically. When stacked at the intermediate vertical-spacing, the upper unit would have to be lifted to disengage one pair of laterally-aligned brackets 27' from the ledges 57. It would then have to be shifted laterally so that the entire brackets 27' on one side of the upper unit passed between the rods 57 and 58, which would then permit the remaining brackets 27' of the upper unit to pass inwardly upward by rod 53, to a position as shown in FIG. 10. Then the remaining brackets 27' of the upper unit could be withdrawn from between the rods 57 and 58 of the under unit, and this would permit the upper unit to be lifted upwardly and out from the under unit.

On occasion, when this adaptation of units is to be returned void of trays of products, the units can be stacked as shown in FIG. 16 in the manner above explained, when stacking at the intermediate level, with the brackets 27' of each upper unit inactive and with the weight of each upper unit being carried by the brackets 56 of each upper unit resting on the brackets 56 and lateral anglebar sections 28 of the under unit, as shown in FIG. 17. The brackets 56 are angled so that each upper unit will laterally center itself above and on each under unit.

When, with this latter adaptation, it is desired to increase the number of ledges for closer spacing of units, a pair of the supplemental components 54 (FIG. 13) are set on pairs of the posts 52 of one unit as shown in FIGS. 13-21. This positions a pair of rods between the rails 53 and the base frame 25 so as to provide a vertically aligned ledge 71 which divides in half the vertical spacing which exists when the units are stacked in their maximum vertical spacing relationship as shown in FIG. 11. With the supplemental component 54 in place, the brackets 27' of the upper unit engages the ledge 71 of the supplemental components. A third unit is then positioned on the ledge 58 of the original or bottom unit. Thereafter as succeeding units are added the brackets 27' of each succeeding unit engage the lowermost available ledges 72. In effect, the use of a pair of supplemental components 54 intersperses a unit midway between each two units when stacked at their maximum vertically-spaced relationship.

Although but two specific embodiments of this invention are herein shown and described it will be understood that details of the construction shown may be altered or omitted without departing from the spirit of the invention as defined by the following claims.

We claim:
1. A rack-forming unit comprising,
 (a) a base frame,
 (b) spacer elements
  vertically disposed
  adjacent the ends of the base frame,
   each having
    a plurality of ledges
     spaced vertically above and inwardly of the base frame ends,
 (c) brackets on the base frame
  adjacent ends thereof
  vertically aligned with the element ledges and
  formed to seat on the spacer-element ledges,
 whereby two or more units may be stacked by positioning the brackets of one unit on the ledges of the spacer elements of another unit to selectively dispose the units in predetermined vertically-spaced relationship.
2. A rack-forming unit as set forth in claim 1 wherein the spaced elements have inwardly-extending recesses between the ledges to permit horizontal shifting of the units relative to each other to determine the positioning of the brackets on the respective ledges of the spacer elements.
3. A rack-forming unit as set forth in claim 1 wherein the spacer elements and the brackets have coacting shoulders engageable to predetermine the vertical alinement of the stacked units.
4. A rack-forming unit as set forth in claim 3 wherein the spacer elements also have horizontal ridges opposed to the shouldered ledges to secure the stacked units against accidental dislodgement from selected positioning on the spacer-element ledges.
5. A tray-supporting, rack-forming unit comprising,
 (a) a base frame of rectangular contour,
 (b) spacer elements
  fixed adjacently inward the corners of the base frame
  in vertical lateral alinement,
   each having recesses
    extending inwardly from the outwardly-facing edges and
    forming ledges
     horizontally-disposed and
     vertically spaced
      each with
       an inwardly-positioned shoulder and
    forming horizontal ridges
     opposed above the respective inner ledges, and
 (c) brackets of inverted U-shape
  fixed on the base frame
   adjacently inwardly the corners thereof, extending outwardly from the lateral sides of the base frame and
   vertically alined with the element ledges,
 whereby two or more units may be positioned in stacked relationship on one or the other of the sets of ledges by positioning one unit above the other and angling the one unit to the other to shift the brackets at the near end of the one unit into the recesses above a near pair of ledges to permit lowering of the brackets at the far end of the one unit onto the horizontally-alined ledges on the far elements and reversing the shift of the one unit to seat all the brackets straddling the selected alined ledges and resting against the respective ledge shoulders to selectively dispose the units in predetermined vertical spaced relationship.
6. A tray-supporting, rack-forming unit as set forth in claim 5 wherein the base frame is structured from angle bars bonded at their ends with the angles facing upwardly inward and the spacer elements are flat plates bonded to and vertically above and adjacently inward the opposite ends of the lateral base-frame angle bars with a rod spanning and at its ends bonded to each lateral pair of plates to serve as a guide rail to facilitate stacking the units.

7. A rack-forming unit comprising,
   (a) a base frame,
   (b) posts
      fixed at the opposite ends of the lateral sides and
      extending upwardly inward above the base frame,
   (c) rods
      having short end portions turned oppositely inward and in spaced relationship to the intermediate portions, and
      spanning and bonded at the turned-in ends to the upper ends of pairs of laterally-alined posts, and
   (d) brackets on the base frame
      adjacent the ends thereof
         vertically alined with the turned-in portions of rods and
         formed to seat on the rods,
   whereby two or more of the units may be stacked by positioning the brackets of one unit on either portions of the rods adjacent the posts to selectively dispose the units in predetermined vertical-spaced relationship.

8. A rack-forming unit as set forth in claim 7 wherein the upper ends of the posts are disposed above the bent ends of the respective pairs of rods to form shoulders vertically-alined with shoulders formed by the bends in the rods engageable by the bracket edges for predetermining the vertical alinement of the stacked units.

9. A rack-forming unit comprising,
   (a) a base frame
   (b) posts
      fixed at opposite ends of the lateral sides of the base frame and
      extending upwardly inward above the base frame,
   (c) pairs of first rods each
      having short end portions turned oppositely inward and in spaced relationship to the intermediate portion, and
      spanned and bonded at the turned-in ends to the upper ends of a pair of laterally-alined posts, and
   (d) a special pair of supplemental components
      each comprising,
         a pair of members,
            one perimetrical portion of each of which is curled inwardly to fit over any of the aforesaid posts, and
            bonded to the opposite ends of
         a pair of auxiliary rods
            with the curled perimeters of the members opposed in opposite angular disposition and
            laterally spaced apart to set the curled perimeters embracively on pairs of laterally-aligned posts
               to locate the pair of auxiliary rods intermedially parallel with the respective first rods and the base frame, and
   (e) brackets of inverted U-shape
      fixed on the base frame
         adjacently inward the corners thereof, and
         extending outwardly of the lateral sides of the base frame, and
         formed to seat on the rods,
   whereby two or more of the units may be stacked by positioning the brackets of one unit either on portions of the pairs of first rods or on either pairs of rods of either pair of supplemental components to selectively dispose the two units in predetermined vertical spaced relationship.

References Cited in the file of this patent
UNITED STATES PATENTS

| | | |
|---|---|---|
| 2,994,463 | Drader | Aug. 1, 1961 |
| 3,018,002 | Glezen | Jan. 23, 1962 |